C. R. BASFORD.
CHANGEABLE DRIVE MECHANISM FOR AUTOMOBILES.
APPLICATION FILED JUNE 23, 1909.
994,367.
Patented June 6, 1911.
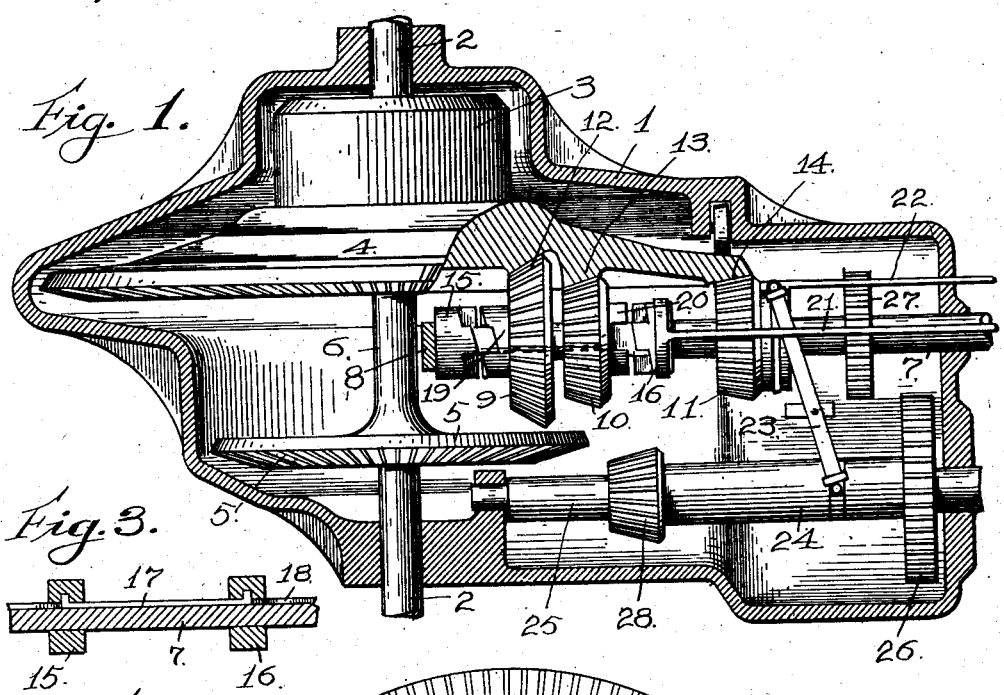

UNITED STATES PATENT OFFICE.

CLAUDE R. BASFORD, OF SAN FRANCISCO, CALIFORNIA, ASSIGNOR OF THREE-EIGHTHS TO WALTER R. BLODGETT, OF WILLETS, CALIFORNIA, AND TWO-EIGHTHS TO C. A. PHENEGAR, OF OAKLAND, CALIFORNIA.

CHANGEABLE-DRIVE MECHANISM FOR AUTOMOBILES.

994,367.  Specification of Letters Patent.  Patented June 6, 1911.

Application filed June 23, 1909. Serial No. 503,851.

*To all whom it may concern:*

Be it known that I, CLAUDE R. BASFORD, a citizen of the United States, residing at the city and county of San Francisco and State of California, have invented certain new and useful Improvements in Changeable-Drive Mechanism for Automobiles, of which the following is a specification.

The hereinafter described invention relates to means for imparting or transmitting to an automobile a variable speed, the object being to provide in a simple and compact form transmitting means for imparting a high, low and intermediate speed to the automobile, and for reversing the direction as to travel of the machine.

To comprehend the invention, reference should be had to the accompanying sheet of drawings, wherein—

Figure 1 is a plan view of the drive mechanism with the housing therefor in section, said view disclosing the changeable speed disk with its concentric cog-rings partly broken away, the pinions on the drive shaft for engaging said cog-rings, and the means for transmitting a reversing movement to the automobile. Fig. 2 is a side elevation of the driven gear for the changeable speed mechanism. Fig. 3 is a detail view of the slide clutches and the drive shaft.

In the drawings, the numeral 1 is used to designate a housing for inclosing the speed controlling mechanism, and through which extends transversely the usual shaft 2 or the rear axle of an automobile, the inner ends of which axle, not shown, project into the casing 3 located within the housing 1 and which contains the differential gears for rotating the axle. On the shaft 2, are loosely mounted the changeable speed disk 4, and the reversing gear 5, which are held separated by the spacing spool 6, united to both, the changeable speed disk 4 being united in any suitable manner to the casing 3 of the differential mechanism.

Into the housing 1 extends the longitudinally disposed drive shaft 7, the inner end of which works in the bearing 8. On the said drive shaft are loosely mounted the pinions 9, 10, and on the same is slidably mounted the pinion 11, which pinions engage with the cog-rings 12, 13 and 14 of the changeable speed disk 4, the said cog-rings indicating respectively the high, intermediate, and low speed drive.

The pinions 9—10 are locked to the drive shaft 7 for imparting rotation respectively to the high and intermediate cog-rings 12—13 of the changeable speed disk 4, by means of the crown clutches 15—16, which clutches are connected by the link 17, slidably seated within a longitudinally disposed groove 18 cut in the drive shaft 7, the said clutches being moved respectively into locked engagement with the clutch members 19—20 of the pinions 9—10, by means of the operating rod 21. The slide pinion 11 is moved into and out of mesh with the cog-ring 14 by means of the operating rod 22, which actuates the lever 23, engaging the shoulder of the said slide pinion 11, the lower end of the said lever engaging the sleeve 24 slidable on an auxiliary shaft 25. This sleeve carries a gear 26 for engaging with the gear 27 on the drive shaft 7, and a pinion 28 for meshing with the reversing gear 5, so that when the gears 26 and 27 are in mesh the motion of the drive shaft 7 will be transmitted to the sleeve 24, the motion of which, in turn, will be imparted by the pinion 28 to the gear 5 for reversing the rotation of the axle of the automobile.

When the pinion 9 is locked to the drive shaft 7 by the described clutch mechanism, the machine will be driven at high speed, but when the clutch connection between said pinion and the drive shaft is released and clutch connection made with the pinion 10, the machine will be driven at an intermediate speed. On shifting the clutch means to release the pinion 10 from locked connection with the drive shaft 7, and shifting the position of the slide pinion 11 on said shaft to place the same in mesh with the cog-ring 14 of the changeable speed disk 4, the machine will be driven under low speed, during which time the pinions 9 and 10 will run as idle pinions, but in mesh with the cog-rings 12 and 13 of the driven disk 4.

When it is desired to reverse the rotation of the driven disk 4 and the transmission means operated thereby, the pinions 9, 10 and 11 are thrown out of operable connection with the changeable speed disk 4, and the sleeve 24 shifted on the auxiliary shaft 25 to place the gear 26 into engagement with the gear 27, secured to the drive shaft 7, and the pinion 28 into mesh with the gear 5, so that the rotation of the drive shaft 7 will be transmitted reversely to the gear 5, and the parts connected therewith, and a reverse movement of travel thus imparted to the machine.

The described mechanism is at all times under the direct control of the driver of the machine, and the change in the speed of the car may be varied at will and this irrespective as to whether the same is running under high, intermediate or low speed.

Having thus described the invention, what is claimed as new and desired to be protected by Letters Patent is:—

1. In a speed changing drive mechanism for automobiles, the combination of a shaft, a changeable speed disk loose on the shaft, a differential gear casing mounted on the shaft and connected to the changeable speed disk, a drive shaft extending transversely of the first mentioned shaft, separated pinions loosely mounted on the drive shaft, the changeable speed disk having a plurality of rings, one for each of said pinions, slidable crown clutches for locking the loose pinions to the drive shaft, and a link connection between the crown clutches extending through said pinions.

2. In a speed changing drive mechanism for automobiles, the combination of a driven shaft, a changeable speed disk loose on the shaft, a reversing gear disk loose on the shaft, the two disks being spaced from one another by a connecting member, a differential gear casing mounted on the driven shaft and connected to the changeable speed disk, the changeable speed disk having gear rings, separated pinions having clutch members on their outer surfaces, said pinions normally engaging respectively the gear rings of the changeable speed disk, a drive shaft extending transversely of the driven shaft and loosely passing through said pinions with an end projecting between the reversing gear disk and changeable speed disk, a clutch slidable on said projecting end adjacent the clutch member of one of the pinions, an auxiliary clutch slidable on the drive shaft adjacent the clutch member of the other pinion, a connection between the clutches for simultaneously operating the same, an auxiliary sliding sleeve extending parallel with the drive shaft, a pinion carried by said sleeve and adapted in one position thereof to mesh with the reversing gear disk, gearing for connecting said sleeve and the drive shaft, a gear carried by the changeable speed disk, an auxiliary pinion slidably mounted on the driving shaft and arranged to mesh with the last mentioned gear on the changeable speed disk, and a lever connection between said auxiliary pinion and the auxiliary sliding sleeve.

3. In a speed changing drive mechanism for automobiles, the combination of a shaft, a changeable speed disk loose on the shaft, a reversing gear disk loose on the shaft, the two disks being spaced from one another by a connecting spool loose on the shaft, a differential gear casing mounted on the shaft and connected to the changeable speed disk, a drive shaft extending transversely of the first mentioned shaft, separated pinions loosely mounted on the drive shaft, and an auxiliary pinion slidably mounted on the drive shaft, the changeable speed disk having a plurality of rings, one for each of said pinions, clutches for locking the loose pinions to the drive shaft, a sliding shaft, a pinion thereon arranged to mesh with the reversing gear of the first mentioned shaft, gearing to connect the sliding shaft and drive shaft, and a link connection between said sliding shaft and the slidable pinion of the drive shaft.

4. In a speed changing drive mechanism for automobiles, the combination of a shaft, a changeable speed disk loose on the shaft, a reversing gear disk loose on the shaft, the two disks being spaced from one another by a connecting spool, a differential gear casing mounted on the shaft and connected to the changeable speed disk, a drive shaft extending transversely of the first mentioned shaft, separated pinions loosely mounted on the drive shaft and an auxiliary pinion slidably mounted on the drive shaft, the changeable speed disk having a plurality of rings, one for each of said pinions, crown clutches for locking the loose pinions to the drive shaft, a link connection between the crown clutches, slidably sleeved within a longitudinally disposed groove in the drive shaft, an operating rod, and a gear connection between the sliding pinion and the reversing gear disk.

5. In a speed changing drive mechanism for automobiles, the combination of a shaft, a changeable speed disk loose on the shaft, a reversing gear disk loose on the shaft, the two disks being spaced from one another by a connecting spool, a differential gear casing mounted on the shaft and connected to the changeable speed disk, a drive shaft extending transversely of the first mentioned shaft, separated pinions loosely mounted on the drive shaft and an auxiliary pinion slidably mounted on the drive shaft, the changeable speed disk having a plurality of rings, one for each of said pinions, crown clutches for locking the loose pinions to the shaft, a link connection between the crown clutches, slidably sleeved within a longitudinally disposed groove in the drive shaft, an operating rod, an auxiliary rotatable and slidable shaft extending longitudinally of the drive shaft, a gear and a pinion thereon, and a clutch lever engaging respectively the sliding pinion of the drive shaft and the auxiliary shaft whereby to engage the slidable pinion with the gear of the auxiliary shaft and the pinion of the auxiliary shaft with the reversing gear disk.

In testimony whereof I have signed my name to this specification in the presence of two subscribing witnesses.

CLAUDE R. BASFORD.

Witnesses:
N. A. ACKER,
A. K. DAGGETT.

Copies of this patent may be obtained for five cents each, by addressing the "Commissioner of Patents, Washington, D. C."